Dec. 27, 1955 G. EHRENBERG 2,728,286
HAMBURGER SANDWICH BROILER
Filed Feb. 10, 1951 2 Sheets-Sheet 1

INVENTOR.
GUSTAVE EHRENBERG
BY
Busser and Harding
ATTORNEYS.

Dec. 27, 1955 G. EHRENBERG 2,728,286
HAMBURGER SANDWICH BROILER
Filed Feb. 10, 1951 2 Sheets-Sheet 2
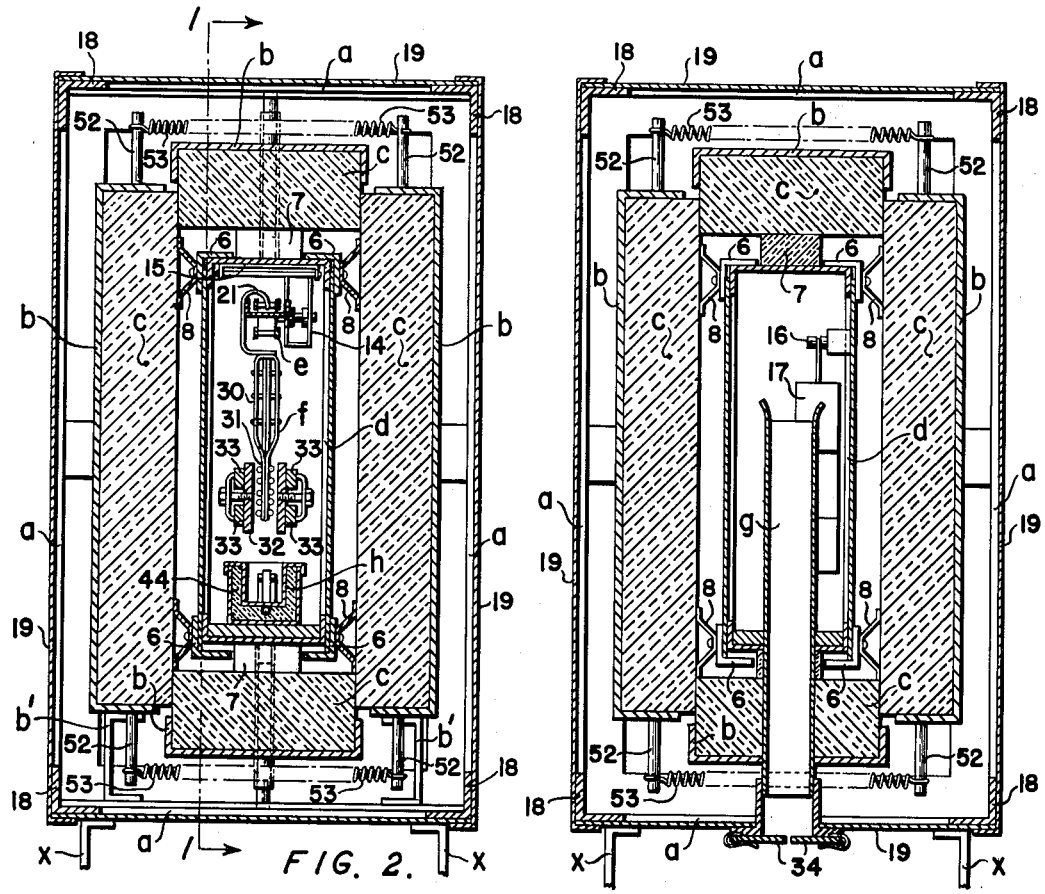
FIG. 2.
FIG. 3.
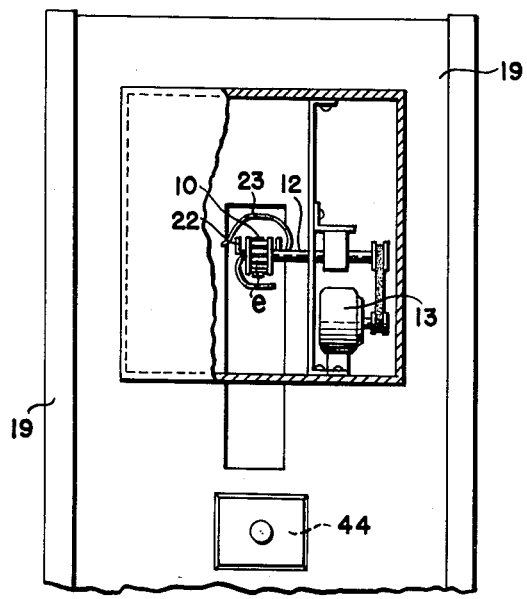
FIG. 4.
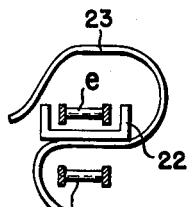
FIG. 5.
INVENTOR.
GUSTAVE EHRENBERG
BY
Busser and Harding
ATTORNEYS.

United States Patent Office 2,728,286
Patented Dec. 27, 1955

2,728,286
HAMBURGER SANDWICH BROILER

Gustave Ehrenberg, Philadelphia, Pa.

Application February 10, 1951, Serial No. 210,297

6 Claims. (Cl. 99—386)

In preparing an ordinary so-called hamburger sandwich, the meat is usually subjected to heat, as by frying, in such manner as to measurably impair its taste and flavor. Usually, the meat is in contact during heating with a hot pan, from which grease that is the product of previous operations has not been removed, and adequate cooking of the interior of the meat cake involves non-uniform cooking of the mass with searing of the outside skin of the cake. Moreover, there is rarely, if ever, uniformity in different products, due not only to variations in temperature, but due also, even where the operation is conducted by a single cook, to non-uniformity in the length of time to which different meat cakes are subjected, since the operation depends on the skill and care of the cook. Another and perhaps the most serious impairment of taste is due to the excessive loss, in the cooking operation, of the meat juices.

The object of my invention is to provide a heating apparatus, which may properly be termed a broiler, in which the meat cake is subjected to heat in such manner as to retain a much larger proportion of the meat juices and thus impart to the sandwich a more acceptable flavor or taste than characterize the conventional hamburger sandwich. Other and closely related objects are to subject the meat cakes to heat in such manner as to avoid contamination by any residual grease of other previously cooked meat cakes, in which the meat will be cooked throughout to the ideal degree, in which the temperature of cooking is maintained constant, in which the duration of the process is predetermined and constant, in which all conditions are the same regardless of the number of sandwiches that are produced, in which no cooking skill on the part of the operator is required, and in which the apparatus functions as a true broiler, with the superior taste that usually is attributed, with good reason, to meats that are broiled as distinguished from frying or other heating operations.

A preferred embodiment of the invention is shown in the accompanying drawings, in which—

Fig. 1 is a longitudinal section through the broiler.

Figs. 2 and 3 are cross-sections on the lines 2—2 and 3—3, respectively, of Fig. 1.

Fig. 4 is a detail view of the conveyor driving means.

Fig. 5 is a detail view of the means facilitating the placement on the conveyor of the roll and meat holder.

Figure 1:
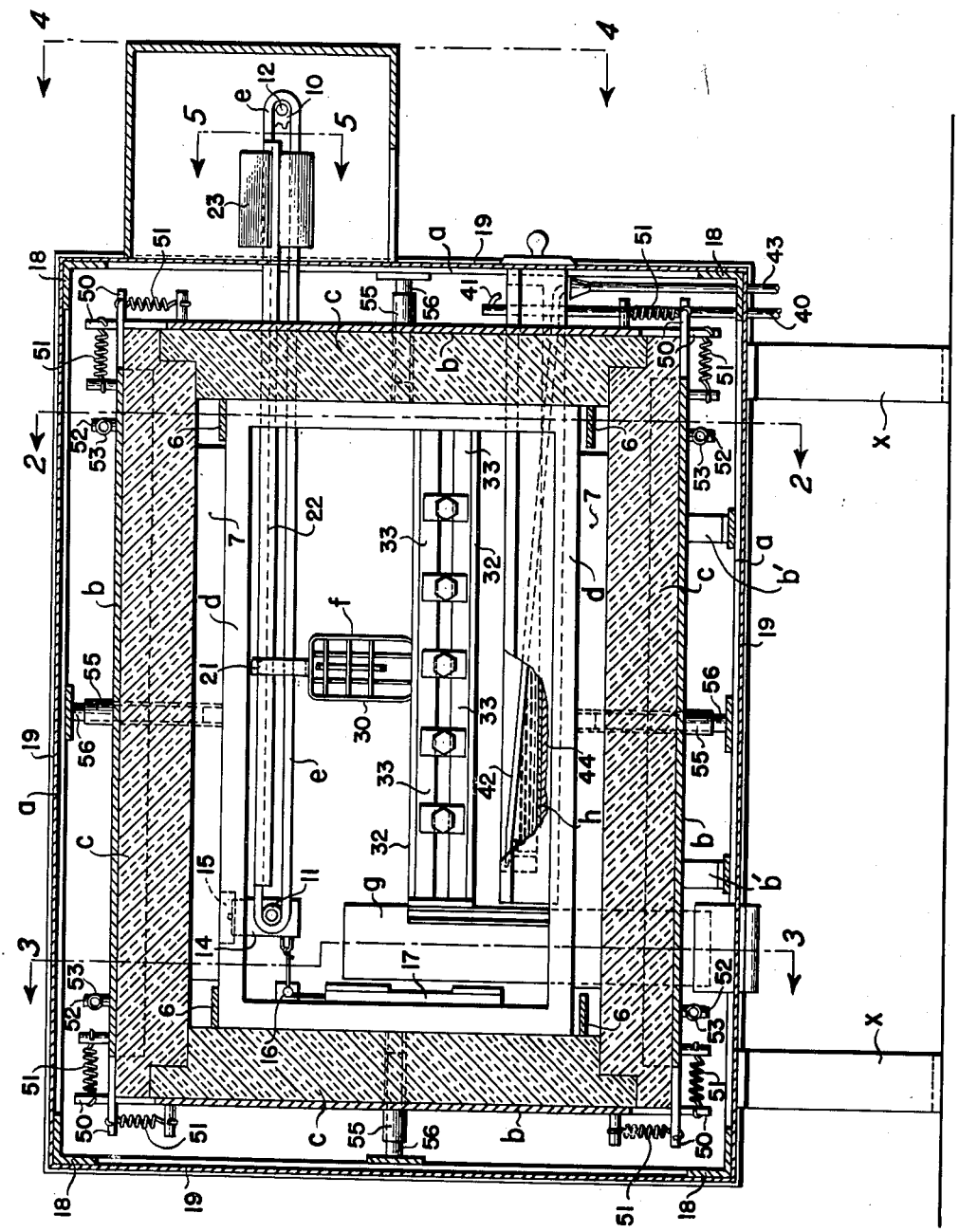

The entire apparatus is mounted on a suitable support, as, for example, four pedestals $x$. Upon these standards rests an outer shell $a$ within which and spaced therefrom are angle bars $b$ enclosing sections of a thick wall $c$ of insulating material, within which is the broiling chamber $d$, which may conveniently be designated the furnace.

The side angle bars $b$ are supported on the outer shell $a$ by means of standards $b'$.

The ends of the furnace abut against the end sections of the insulating wall $c$ as shown in Fig. 1. The top, bottom and sides of the furnace $d$ are spaced from the top, bottom and end sections of the insulating wall $c$, as shown in Figs. 2 and 3.

To support the furnace and at the same time provide for expansion and contraction of the furnace walls, sleeves 55 extend from the ends and top and bottom of the furnace walls and telescopically engage pins 56 secured to the inner wall of the outer shell $a$.

Secured to the upper and lower corners of the furnace are angle bars 6 the horizontal arms of which extend on opposite sides of ribs 7 projecting from the upper and lower sections of the insulating wall $c$, allowing relative vertical movement of the furnace and the top and bottom sections of the insulating wall $c$. The vertical members of these angle bars are secured to the side sections of the insulating wall $c$ by arched plates 8 of flexible material, allowing relative side movement of the furnace and the side sections of the insulating wall $c$.

The top and bottom angle bars $b$ are connected to the end angle bars $b$ by tension spings 51 extending between the projecting end of one angle bar and a projection 50 on the adjacent end of another angle bar, as shown in Fig. 1. The side angle bars are provided, top and bottom, with projections 52, between which extend springs 53, as shown in Figs. 2 and 3.

Extending from outside the above structure into and throughout nearly the whole of the length of the furnace is an endless conveyor—conveniently a sprocket chain $e$ driven by a driving sprocket wheel 10, which is in turn driven, by intermediate driving connections 12, from a motor 13, as shown in Fig. 4. At the far end of the furnace the sprocket chain engages an idler pulley 11. The upper reach of the conveyor, moving from the outside driving sprocket wheel, may be said to be the advancing reach while the lower reach of the conveyor, returning to the outside driving sprocket wheel, may be said to be the return reach.

The holder $f$ for both the roll and the meat cake is carried by the advancing upper reach of the conveyor from outside the furnace to the far end of the furnace. The holder $f$ is suspended from the upper reach of the driving sprocket by a hook 21. To facilitate the placement of the hook centrally over the conveyor, the track 22 along which the outer end of the conveyor travels (see Fig. 5) has secured to its lower end one end of a spring loop 23, which thence extends over the conveyor, its free end extending downward fairly close to and beyond one edge of the track 22. To hang the holder onto the conveyor, the holder is moved upward so that the hook 21 extends between the track 22 and the free end of spring 23 and engages and lifts the free end of the spring, which then, springing back into the position shown in Fig. 5, centers the hook on the conveyor.

The holder $f$ comprises an upper roll-holder part 30 and a lower meat-holding part 31, the two parts being secured together, or integral one with the other, to form a screen consisting of two halves hinged together along adjacent vertically extending edges; the two halves being swung open to allow the insertion of the two halves of a roll within the part 30 and the insertion of a meat cake between the two halves of the part 31.

In the travel of the holder or screen $f$ through the furnace, the lower part 31 of the screen extends between plates 32, 32, which are heated by heaters 33, 33. The heater may be any type of heater known in the heater art, preferably one in which the source of heat is an electric current controllable, as is well understood, to impart any predetermined temperature to the plates 32 and to the interior of the furnace. It seems highly desirable, if not necessary to give the best results, to maintain a temperature within the furnace that is not substantially less than 900° F. and not substantially above 1100° F. A temperature approximating 1000° F. has been found quite satisfactory. It may be noted that the meat is subjected not only to the furnace heat, adequate to properly toast the roll, but also receives radiant heat from the hot plates 32 between which it moves. It may be mentioned that the degree of heat should vary with the length of time within which the meat and roll are subjected to heat and the time factor is of course dependent upon the time required for the holder $f$ to travel through the furnace. It should therefore be stated that the speed of the conveyor $e$ should be such, at the given temperature, as to expose the sandwich elements to heat for about one minute. It is clear that the speed of the conveyor and the temperature in the furnace can readily be adjusted so as to avoid, on the one hand, superficial searing or scorching and, on the other hand, inadequate heating, of the entire mass of the meat. The above recommended conveyor speed and temperature discloses one preferred way of balancing the factors of time and temperature.

When the holder or screen $f$ reaches the far end of the conveyor, it rolls off the conveyor and drops through the chute $g$. It is preferred to drop the holder onto a gate 34 composed of two wings hinged along their longer edges and extending thence inward toward one another to close the exit from the chute $g$, but which may be opened to permit the screen, with its cooked contents, to be deposited upon any suitable receiver; after which the two halves of the screen or holder are swung on their hinge and the roll halves and broiled meat cake removed and the meat cake inserted, of course, between the roll halves to form the sandwich. This gate should be kept closed during most of the operating time to minimize circulation of cold air through the furnace.

During the progress of the meat through the furnace, a certain limited amount of grease and meat juice will escape. As hereinbefore stated, and as is clearly shown in Fig. 2, the lower part 31 of the screen—the meat-holding element—extends between the heated plates 32, 32. Such limited amount of grease and meat juice that escapes will therefore fall freely toward the floor of the heater and will not deposit upon the heating element. But it is found that the accumulation of these droppings on the floor of the heater and the evaporation thereof create an atmosphere within the furnace that more or less contaminates the sandwich elements. To avoid such effect, there is inserted in the furnace, directly below the carrier, a tray $h$ containing a pool of water to receive and hold the droppings in solution or suspension. If this pool were stagnant the water would soon evaporate. To avoid this, water, preferably cold, is continually supplied to and removed from the tray so that the entire body of water present at any one time in the tray is not heated to the temperature required for evaporation, or at least not heated to the temperature at which evaporation is a serious factor. To introduce the water to the tray, I provide, outside the furnace (see Fig. 1), in the space between the shell $a$ and one end section of the insulating wall $c$, a vertically extending pipe 40 through which, from an appropriate source, water constantly flows upward and discharges through a nozzle 41 into the end of the tray projecting into said space. From the far end of the tray, a pipe 42 extends through and beyond the furnace into said space and there discharges into a funnel at the top of a water-discharge pipe 43. The water in the tray $h$ accumulates until it reaches the level of the far open end of the pipe 42, whence it overflows into the same and is carried to the discharge. The depth of the water pool in the tray $h$ depends upon the distance of the open admission end of the pipe above the bottom of the tray. The temperature of the water pool is dependent, of course, upon the depth of the pool and upon the rate at which fresh water is supplied to and removed from the tray. These factors may vary within rather wide limits.

In order to minimize absorption of heat by the water pool the tray $h$ is set into a channel 44 (see Fig. 2) of insulating material so that only the surface of the water pool is exposed to the direct heat of the furnace. This further insures against substantial evaporation.

Reference has hereinbefore been made to the provisions made for taking care of bodily vertical and transverse movements of the furnace relative to its surrounding wall, due to contraction and expansion. The conveyor $e$ is subject to lengthwise contraction and expansion due to the heat within the furnace. Expansion in the direction of its length must not be allowed to affect its driving connection with the idler pulley 11. To insure maintenance of such driving connection, this pulley is carried by a shaft rotatable in a hanger or hangers 14 which is movable, preferably pivotally supported, in a recess 15 formed in the furnace wall to allow swinging movement of the hanger. Connected to the hanger 14 is a chain or other flexible connection extending over a pulley 16 carrying a weight 17: whereby the pulley 11 is always held in driving connection with the conveyor $e$.

The shell $a$ is desirably composed of an inner angle frame 18 of ordinary carbon steel and an outer surface shell 19 of stainless steel.

The length of the furnace $d$ and the number of holders or screens $f$ that may be suspended therein at any one time are of course matters of choice, but I have found it convenient to make the furnace of such length that the holders or screens may be hung from the conveyor $e$ sufficiently close together to allow seven of them to be contained in the furnace at any given time. Since the conveyor, as previously described, may travel at such rate as to allow a broiling period of about one minute, finished sandwiches can be produced at that rate, so as to take care of what, at the height of a lunch period, may be assumed to be maximum demand. When demand falls off, holders, carrying the rolls to be toasted and the meat to be broiled, may be suspended from the conveyor at any wider intervals of time required to satisfy the demand.

What is claimed is:

1. A hamburger sandwich broiler including in combination a horizontally extending furnace, an endless conveyor extending horizontally through substantially the entire length of the furnace, elongated transversely spaced heatable plates within the furnace extending in the direction of conveyor travel, and a holder supported from the conveyor, said holder including a meat-holding part and a roll-holding part in vertically spaced arrangement, the meat-holding part being positioned in the space between the spaced heatable plates and the roll-holding part being positioned out of the space between the spaced heatable plates during passage of the holder through the furnace.

2. A hamburger sandwich broiler including in combination a horizontally extending furnace, an endless conveyor extending horizontally through substantially the entire length of the furnace, elongated transversely spaced heatable plates within the furnace below the conveyor extending in the direction of conveyor travel, and a holder adapted to be suspended from the conveyor and to be discharged therefrom after its passage through the furnace, said holder including a meat-holding part and a roll-holding part in vertically spaced arrangement, the meat-holding part being positioned below the roll-holding part and in the space between the spaced heatable plates and the roll-holding part being positioned out of the space between the spaced heatable plates during passage of the holder through the furnace.

3. In a hamburger sandwich broiler, the combination, with a furnace, of a roll and meat holder, an endless conveyor extending from outside the furnace to and within the furnace and upon which the holder is adapted to be suspended and from which it is adapted to be discharged after its passage through the furnace, a leaf spring secured outside the furnace extending successively upward over and across the conveyor and thence downward to its free end, and a hook extending from the top of the holder which, in an upward movement of the holder preparatory to application to the conveyor, engages and lifts the free end of the spring, whereby the spring is thrown into tension and, on its return to normal position when the hook has moved upwardly to a position above the conveyor, moves the hook across the conveyor and deposits the hook upon the conveyor.

4. A hamburger sandwich broiler including in combination an elongated furnace, an endless conveyor extending through substantially the entire length of the furnace, a driving pulley adjacent to one end of the furnace about which one end of the conveyor travels and a driven pulley adjacent to the other end of the furnace about which the other end of the conveyor travels, elongated transversely spaced heatable plates within the furnace below the conveyor extending in the direction of conveyor travel, and a holder adapted to be suspended from the conveyor and to be discharged therefrom after its passage through the furnace, said holder including a meat-holding part and a roll-holding part, the meat-holding part being positioned below the roll-holding part and in the space between the spaced heatable plates and the roll-holding part being positioned out of the space between the spaced heatable plates during passage of the holder through the furnace, a holder suspension device adapted to be hung on the upper reach of the conveyor and extending laterally and downwardly and clearing the lower reach of the conveyor and carrying at its lower end the holder so that upon reaching the pulley at the end of travel of the upper reach of the conveyor the suspension device rolls off the conveyor, and a chute through which the released holder is adapted to drop.

5. A hamburger sandwich broiler including in combination a horizontally extending furnace, an endless conveyor extending horizontally through substantially the entire length of the furnace, elongated transversely spaced heatable plates within the furnace below the conveyor extending in the direction of conveyor travel, a holder adapted to be suspended from the conveyor and to be discharged therefrom after its passage through the furnace, said holder including a meat-holding part and a roll-holding part in vertically spaced arrangement, the meat-holding part being positioned below the roll-holding part and in the space between the spaced heatable plates and the roll-holding part being positioned above and spaced from the space between the spaced heatable plates during passage of the holder through the furnace, and means including a tray positioned immediately below the space between the spaced heatable plates for catching grease dripping from meat in holders passing through the furnace.

6. A hamburger sandwich broiler including in combination a horizontally extending furnace, an endless conveyor extending horizontally through substantially the entire length of the furnace, elongated transversely spaced heatable plates within the furnace below the conveyor extending in the direction of conveyor travel, a holder adapted to be suspended from the conveyor and to be discharged therefrom after its passage through the furnace, said holder including a meat-holding part and a roll-holding part in vertically spaced arrangement, the meat-holding part being positioned below the roll-holding part and in the space between the spaced heatable plates and the roll-holding part being positioned above and spaced from the space between the spaced heatable plates during passage of the holder through the furnace, and means including a heat insulated tray positioned immediately below the space between the spaced heatable plates for catching grease dripping from meat in holders passing through the furnace.

References Cited in the file of this patent

UNITED STATES PATENTS

| Number | Name | Date |
|---|---|---|
| 597,349 | Albright | Jan. 11, 1898 |
| 1,151,356 | Gottschalk | Aug. 24, 1915 |
| 1,171,122 | Hill | Feb. 8, 1916 |
| 1,398,157 | Segar | Nov. 22, 1921 |
| 1,534,867 | Peschke et al. | Apr. 21, 1925 |
| 2,007,874 | Redler | July 9, 1935 |
| 2,138,813 | Bemis | Dec. 6, 1938 |
| 2,168,390 | Bemis | Aug. 8, 1939 |
| 2,181,847 | Finizio | Nov. 28, 1939 |
| 2,182,229 | Hamel | Dec. 5, 1939 |
| 2,300,837 | Ames | Nov. 3, 1942 |
| 2,337,117 | Lloyd | Dec. 21, 1943 |
| 2,369,274 | Beatty | Feb. 13, 1945 |
| 2,377,873 | Finizie | June 12, 1945 |
| 2,404,915 | McCullough | July 30, 1946 |
| 2,465,611 | Singer | Mar. 29, 1949 |
| 2,470,446 | Rankin | May 17, 1949 |
| 2,512,118 | Snow | June 20, 1950 |
| 2,533,080 | Alexander | Dec. 5, 1950 |